Aug. 18, 1942.   E. A. G. COLLS ET AL   2,293,594
ELECTROLYTIC CELL
Filed May 27, 1939   3 Sheets-Sheet 2
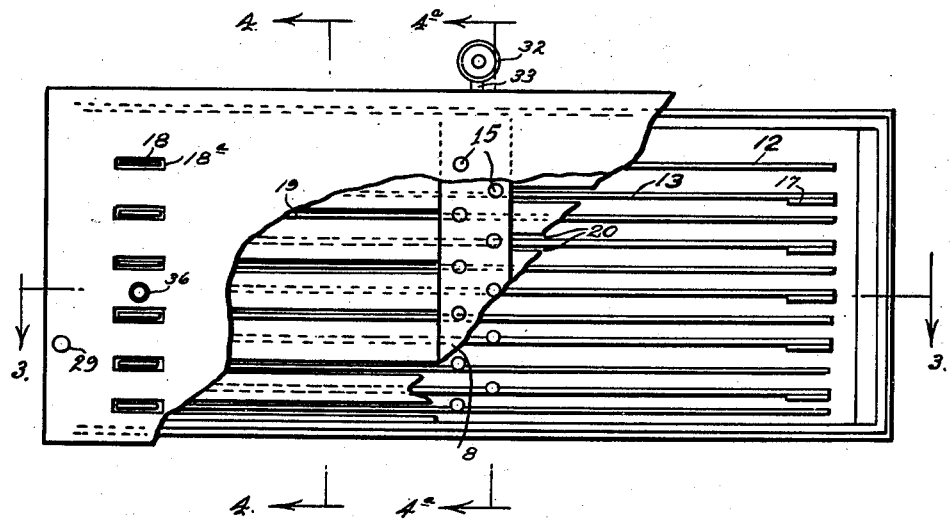
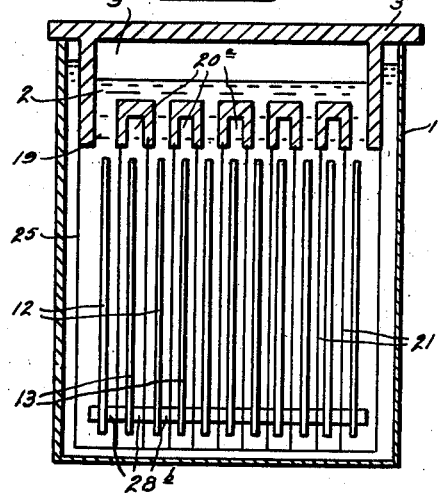
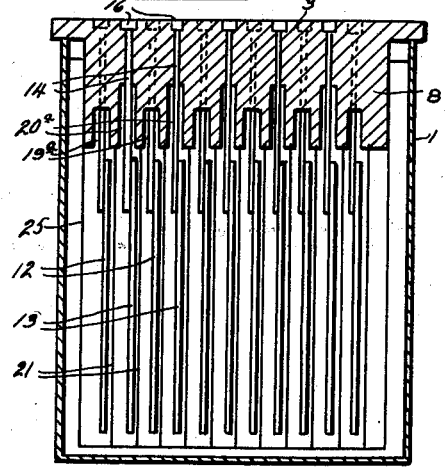
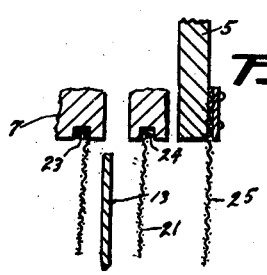
INVENTORS
Edward Arthur Geoffrey Colls
Alexander Whiteside Moore
Darcy Drummond Morris
ATTORNEY Aug. 18, 1942.    E. A. G. COLLS ET AL    2,293,594
ELECTROLYTIC CELL
Filed May 27, 1939    3 Sheets-Sheet 3
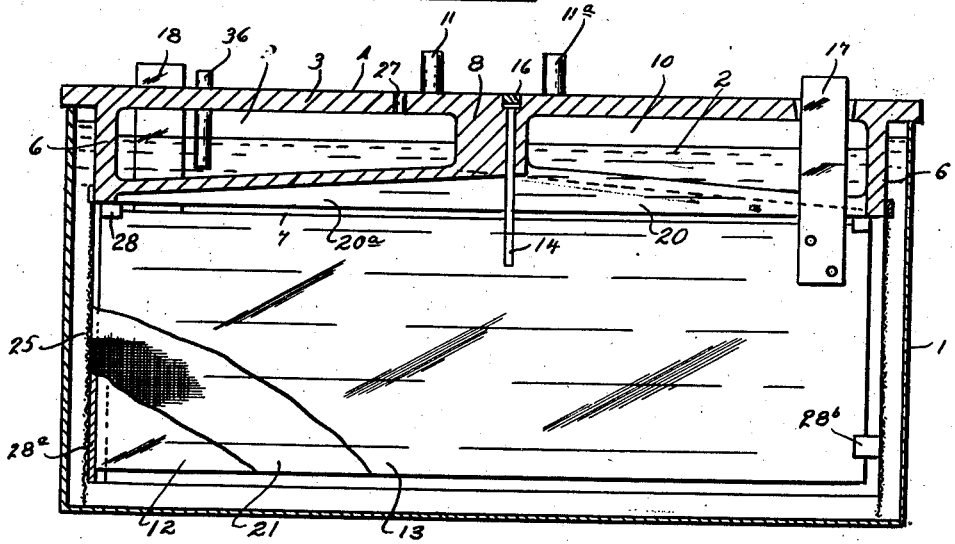
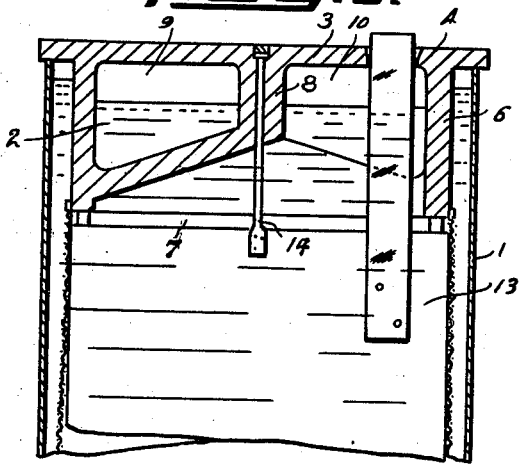
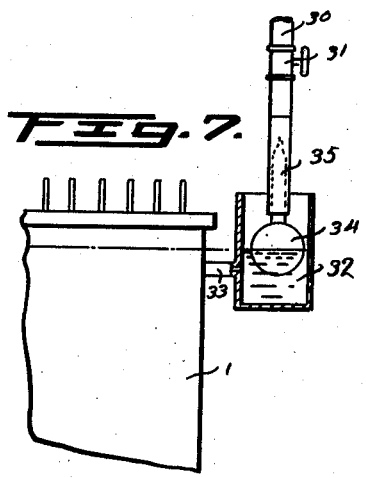
INVENTORS
Edward Arthur Geoffrey Colls
Alexander Whiteside Moore
Darcy Drummond Morris
ATTORNEY Patented Aug. 18, 1942

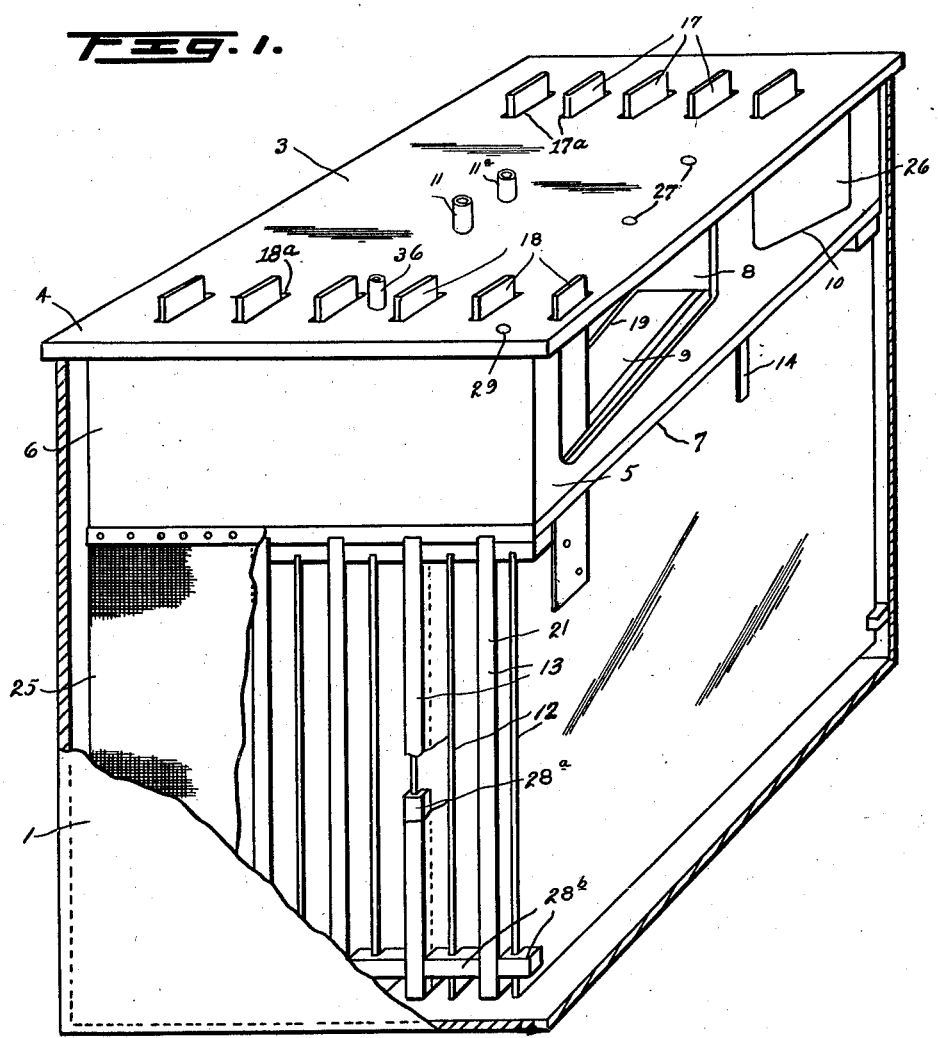

2,293,594

UNITED STATES PATENT OFFICE 2,293,594

ELECTROLYTIC CELL

Edward Arthur Geoffrey Coils, Alexander Whiteside Moore, and Darcy Drummond Morris, Trail, British Columbia, Canada, assignors to The Consolidated Mining and Smelting Company of Canada, Limited, Montreal, Quebec, Canada, a company of Canada Application May 27, 1939, Serial No. 276,158

6 Claims. (Cl. 204—258)

Our invention relates to improvements in electrolytic cells and, more particularly, to a new type of cell cover in which are incorporated gas collecting compartments for the separate collection of the gases resulting from the electrolytic decomposition of solutions.

The invention is particularly directed to providing a unitary combined gas collector and cell cover, cast of non-conductive material, for electrolytic diaphragm cells of the tank type. The cell cover is formed with side walls, end walls, a top and a bottom, which form a chamber divided, by means of a gas-tight partition, into two gas collecting compartments. The cell cover is supported by the walls of the cell tank, being designed to rest uniformly upon the upper portion of the cell tank. Alternative positive and negative electrodes are suspended from the cell cover. Ports and inverted channels are formed in the bottom of the cell cover, an aligned port and inverted channel being over each electrode, each port and channel meeting and terminating at the partition. Each of the ports above the positive electrodes extends into one of the gas collecting compartments and each of the ports above the negative electrodes extends into the other of the gas collecting compartments, and through these ports all the gases evolved at the electrodes enter their respective gas collecting compartments.

The specific embodiment of our invention described and illustrated herein is particularly adapted for use in conjunction with a cell of the tank type in which hydrogen and oxygen, resulting from the electrolytic decomposition of water, are separately collected in a high state of purity. It will be clearly understood, however, that with minor modifications, the invention may be applied to any electrolytic cell of the tank type provided the electrolyte and the gases evolved from it do not have a deleterious or corrosive effect upon the material of which the apparatus is constructed. In instances where the electrolyte or gases would have a corrosive effect on the preferred type of materials disclosed herein, it will be necessary, of course, to use other types of materials not subject to such corrosive action.

Electrolytic cells for the electrolysis of water and for the separate recovery of hydrogen and oxygen therefrom, are relatively well known and usually consist of a water-tight container or tank constructed to hold electrolyte into which the electrodes, suitably connected to positive and negative electrical terminals, are suspended vertically, oxygen being liberated at the anode and hydrogen at the cathode.

The gases produced are kept separated from each other by the use of porous diaphragms formed of such material as woven asbestos. The diaphragms may surround either each of the electrodes or only each of the electrodes of the same polarity. In the latter case, a skirting of suitable material is placed around the whole assembly.

The porous diaphragms, when in position in the cell and immersed in the electrolyte, permit the free passage of solution therethrough but prevent the passage of gas bubbles. The gases evolved at the enclosed electrodes, being restricted under ordinary back pressures from passing through the diaphragm material and thus becoming mixed with gas evolved at electrodes of opposite polarity, rise separately through the columns of electrolyte enclosed by the diaphragms into gas collecting bells fitted over each electrode. From the electrode bells, the gases rise into their respective gas collecting compartments, the connections between the bells and the collecting compartments being such that the gas from the anode bells passes into one collecting compartment and the gas from the cathode bells passes into the other. Each of the gases is passed from the collecting compartments to its respective collecting container, such as a gasometer.

In cells for the electrolysis of water the gas collecting compartments and electrode bells are usually formed of steel or iron, each electrode bell being designed to fit over its respective electrode. The diaphragms are usually suspended from these bells and may extend almost to the bottom of the cell tank. In this manner, the electrodes are completely enclosed by the diaphragms and electrode bells. In the modification wherein the diaphragms enclose only the electrodes of one polarity and a skirting surrounds the whole assembly, the gases are still collected separately inasmuch as the gas produced at the enclosed electrodes rises through the columns of electrolyte enclosed by the diaphragms and passes into one set of electrode bells and thence into one of the collecting compartments while the gas produced at the electrodes of opposite polarity rises through the electrolyte and, being prevented from entering the space enclosed by the diaphragm bags and being prevented by the skirting from escaping into the atmosphere, is directed to and collected under the other set of bells and passes into the other collecting compartment.

In the types of cell described hereinabove, the electrode bells are insulated from the collecting compartments and it is also necessary to insulate the electrodes from the electrode bells. In addition, the bus-bars, whether carrying current to or from the electrodes, must be insulated from the collecting bells and it is also necessary to insulate the supports, from which the electrodes are suspended, from the remainder of the cell. As a result, it is necessary to use numerous detachable insulators in the ordinary type of cell. These insulators require constant attention to avoid short-circuits, such as result from the deposition thereon of conducting material from the electrolyte, or of the products of the decomposition or disintegration of such insulators.

One of the serious difficulties encountered in the commercial operation of electrolytic hydrogen cells of the tank type has originated in the occurrence of short-circuits across insulators and between the various metal parts immersed in the electrolyte. These short-circuits greatly accelerate the ordinarily appreciable rate of corrosion of the various metal parts immersed in the electrolyte and, by stimulating secondary electrolysis, lower the quantities of gases recovered while reducing their purity to an appreciable and sometimes dangerous extent and decrease the overall current efficiency of the cell.

One of the principal objects of our invention is to provide a cell cover of non-conducting material, such as a mixture of Portland cement and aggregate, which incorporates all the individual bells into one casting and which also provides in the same casting, two gas collecting compartments wherein the hydrogen and oxygen are separately collected in a highly purified form and from which the gases may be separately passed to their respective gasometers without danger of intermixing.

Another object of the invention is to provide a cover of non-conducting material which is cast in one piece and designed to fit completely over the top of the tank in such a manner that carbonation of the electrolyte, as a result of contact with the atmosphere, is prevented.

A further principal feature of our invention resides in the novel design of the cell cover by means of which its component parts can be made of a non-conducting material thereby avoiding the reduction in purity of the gases recovered and eliminating the current, gas and corrosion losses which usually result from short-circuiting of the current in various parts of the ordinary electrolytic hydrogen cell of the tank type.

A still further feature of the invention resides in the novel construction of the cover and assembly of parts by means of which the cell is completely enclosed thereby greatly decreasing the maintenance and attention necessary and, at the same time, permitting relatively easy access to the cell for the purpose of renewing the diaphragms or replacing or re-nickeling the electrodes.

Additional features of our invention reside in the manner in which the diaphragms are secured to the bottom of the cell cover to prevent the possibility of gas leakage at the point of connection; the arrangement of the diaphragms to effect a considerable saving in the amount of asbestos material used and the provision of explosion doors which are easily blown out, thereby affording means for the protection of the cell itself and of adjoining apparatus from serious damage in the event of an explosive mixture of gases becoming ignited in the cell.

The manner in which the above and additional features of our invention are realized will be clearly understood from the following description and accompanying drawings in which:

Figure 1 is a perspective view of an electrolytic cell embodying our invention shown partly in cross-section and with a portion of the cell tank walls removed;

Figure 2 is a top plan view shown partly in cross-section;

Figure 3 is a cross-sectional longitudinal view taken along the line 3—3, Figure 2;

Figures 4 and 4a are cross-sectional end elevations through lines 4—4 and 4a—4a, respectively, of Figure 2;

Figure 5 is a cross-sectional detail showing the manner in which the upper portion of each porous diaphragm is secured to the underside of the bottom of the cover;

Figure 6 is a cross-sectional side elevation taken through an anode with the diaphragm removed; and Figure 7 is an end elevation showing a preferred automatic water feeding arrangement.

Like reference numerals refer to like parts throughout the specification and drawings.

In the preferred embodiment of our invention described and illustrated herein, the numeral 1 indicates a rectangular electrolytic cell of the tank taype filled with electrolyte 2. In this embodiment, the electrolyte consists of water into which a suitable chemical, such as sodium or potassium hydroxide, has been added to reduce the internal resistance of the cell to the passage of electrical current.

The cell cover 3 is designed to fit uniformly over the top of the tank and is formed with sides, ends and bottom, numbered 5, 6 and 7 respectively. The top 4 of the cover is slightly larger in area than the top of the cell tank and protrudes beyond the sides and ends thereof to form a flange, which rests upon the upper rim of the tank. The cover being arranged in this position, foreign matter is prevented from entering the interior of the cell and, if desired, a gasket of asbestos or other suitable material may be provided between the flange and the tank rim to form a more effective seal.

The gas-tight partition 8 divides the interior of the cell cover 3 into the hydrogen collecting compartment 9 and the oxygen collecting compartment 10. The gases collected in these compartments are evacuated through nipples 11—11ª to conduits leading to their respective gasometers.

The negative and positive electrodes, 12 and 13 respectively, are suspended from the cover 3 and are secured thereto by means of vertical supporting rods 14. The lower ends of rods 14 are suitably welded or riveted to their respective electrodes while the upper ends are threaded and extend upwardly through orifices 15 provided for that purpose in partition 8. When the electrodes are drawn into position, their upper edges are prevented from touching the bottom of the cover by means of detachable saddles or spacers 20, which are placed at each end of the upper edge of each electrode. The electrodes are drawn tightly into place by means of nuts and washers 16, acting upon the threaded upper portions of rods 14. These nuts and washers 16 are countersunk in the upper surface 4 of the cover. When the electrodes are in place, we prefer to cover the countersunk nuts and washers 16 with a mixture, such as cement grout, to provide the top of the cover with a smooth uniform surface.

Each of the gas ports 19 and 20, in the series of these ports in the floors of the hydrogen collecting compartment 9 and of the oxygen collecting compartment 10, respectively, extends substantially along the full width of the floor of its respective compartment. The ports 19 are located directly above the cathodes 12 and the ports 20 are located directly above the anodes 13.

In the preferred modification of our invention, the floor of each of the gas collecting compartments 9 and 10 slopes downwardly from the base of the vertical partition 8 along the width of each compartment to the base of the outer wall of that compartment. The grooves 19a and 20a are formed in the underside of the bottom 7 of the cell cover, preferably taking the form of inverted rectangular channels. Each of the channels is located directly above its respective electrode and takes the place of the usual iron electrode bell of the ordinary tank type cell. The channels 19a, for collection of hydrogen, are located in our cell directly above the cathodes. Substantially one half of each hydrogen channel 19a is located directly beneath the oxygen compartment 10. The remaining portion of each hydrogen channel 19a is located directly beneath the hydrogen compartment 9 and in the ceiling of this portion of each channel 19a there is located the gas port 19 which leads into hydrogen compartment 9. The ceiling of each hydrogen channel 19a is formed parallel to the sloping floor of the oxygen compartment 10, directly above it. Each ceiling, therefore, slopes upwardly from the point above the corner of the cathode directly beneath it to the point where the channel opens into the hydrogen port 19 above the centre of the cathode. The vertical cross-section of the channel, therefore, is greatest at the section where the gas flow through that channel is greatest, namely, at the section above the centre of each cathode where the channel opens into its port 19. Similar channels 20a for the collection of oxygen are located directly above the anodes. Substantially one half of each oxygen channel 20a extends under hydrogen compartment 9, and the remaining portion of each oxygen channel opens into a gas port 20 leading directly into oxygen compartment 10. The gases in channels 19a and 20a flow in opposite directions before being discharged through ports 19 and 20 into compartments 9 and 10, respectively. It will be understood, of course, that this feature of the invention can be applied in other modifications such as where the floors of compartments 9 and 10 and the ceilings of channels 19a and 20a are formed horizontally.

In our preferred and other modifications, the bus-bars 17 are passed through tapered slots 17a provided in the top 4 of the cover and are riveted or welded to the positive electrodes 13. The bus-bars 18 are passed through the tapered slots 18a and are riveted or welded to the negative electrodes 12. We have found it most convenient to pass the bus-bars 17 through the oxygen compartment and downwardly through the ports 20 to contact the anodes directly beneath those ports. Similarly, the bus-bars 18 are passed through ports 19 to contact the negative electrodes. When the assembly is completed, the tapered slots 17a and 18a are made gas-tight by sealing around the bus-bars, preferably with a cement grout.

As stated hereinbefore, we have found that there are several expedients which may be followed in order to ensure the maintenance of a high state of purity of each of the gases collected in the two gas collecting compartments respectively. For example, each of the electrodes may be completely enclosed by a porous diaphragm made of a suitable material such as woven asbestos. Alternatively, a saving of about 50% of the diaphragm material can be effected by enclosing the electrodes of one polarity, for example, the anodes, with diaphragms while surrounding the whole assembly of electrodes with a skirting of suitable material. In the latter modification, a skirting of sheet iron or similar material may be used, but we have found that for this purpose, material such as asbestos is equally effective in our type of cell and, in addition, is not subject to the possibility of short-circuiting with the attendant disadvantages of current, gas and corrosion losses.

In the specific embodiment of our invention described and illustrated herein, we enclose each of the positive electrodes completely with a porous diaphragm 21. Grooves 23 are formed in the underside of the bottom 7 of the cell cover and extend along its entire length and are spaced parallel to, alternately with and substantially equidistant from the channels 19a. The top edge of each of the asbestos diaphragms is tightly wedged into the appropriate grooves 23 by means of iron strips 24. No diaphragms surround the cathodes, but an asbestos skirting 25, fastened around the bottom edges of the cover by means of iron straps extends downwardly to a point just above the bottom of the cell tank.

Each gas collecting compartment may be provided with explosion doors 26, located at each end of the chamber, as illustrated in Figure 1, wherein one door is shown closing one end of the oxygen compartment. These may be formed of material, such as cement or sheet iron, which is capable of withstanding a predetermined maximum pressure and capable of resisting attack by the liquids and gases with which it comes in contact. In the event of an explosion through intermixing and ignition of the gases in the cell, the doors 26 are designed to blow out when the above predetermined maximum pressure is exceeded and, as these doors are below the top cover 4 of the cell, damage is thus greatly restricted and adjoining apparatus is protected from being shattered.

We have found that only when a porous diaphragm is completely immersed in a liquid, can gas bubbles be prevented from passing through it. Even when two layers of asbestos are used, the gases on either side of dry diaphragm bags tend to diffuse through the bags and contaminate each other slightly. We have found it advantageous, therefore, to maintain the electrolyte at a level in the cell such that the electrolyte shall fill the gas collecting compartments 9 and 10 to about one half of their depth. Mixing of the two gases is reduced to a minimum when our cell is operated in this manner, which method of operation is facilitated by the novel design and the use of non-conducting materials of construction.

It will be apparent, of course, that the electrolyte in the cell may be maintained at various operating levels, but we have found that gases of maximum purity are obtained when the electrolyte is maintained in the gas collecting compartments at a level of approximately half their depth.

The tube 36, inserted through the top of the cell cover, serves as a means for indicating when the level of the electrolyte in the cell has become undesirably low. This tube, which may be in the form of an iron pipe, is open at both ends and extends vertically from a short distance above the top of the cover 4, downwardly into one of the gas collecting compartments to a predetermined depth in that compartment. If the level of the electrolyte in the compartment drops to such an extent that the bottom of the pipe ceases to be immersed in electrolyte, then foam and gas will escape through the pipe into the atmosphere and this condition of the cell will be immediately apparent to the operator. The electrolyte may then be adjusted to return it to the desired operating level, the bottom of the pipe then becoming sealed and further escape of foam and gas is prevented until such time as the electrolyte level again falls below the bottom of the pipe. Only one such level indicator is required in each cell as the electrolyte level is substantially the same in each gas collecting compartment.

Water may be added to the cell either intermittently or continuously to maintain the predetermined solution level, and we prefer to employ the simple automatic arrangement illustrated in Figure 7. As stated hereinbefore the solution level in the cell is maintained such that the gas collecting compartments 9 and 10 are filled to about half their depth. One end of the conduit 30 is connected to the water supply and the other end extends into the open topped container 32. The conduit 30 is provided with a manually operated valve 31. The conduit 33 extends through the wall of the cell and the container 32 is located in such a manner that the level of the solution in the container 32 corresponds to the level of the solution in the cell. A float valve 34, carrying a stem 35, floats in the liquid in container 32 with the stem inserted into the open end of conduit 30. As the solution falls in container 32, the float valve 34 lowers, permitting water to flow through conduit 30 into the container and from the container into the cell. As the solution level rises in the container, the float valve rises until the predetermined level is reached at which instant the flow of water through conduit 30 is stopped.

The gases produced by electrolysis are withdrawn from the cell through nipples 11 and 11ª. One nipple is located in the top of each gas collecting compartment and is connected, by means of suitable piping, to the gas mains which, in turn, lead to appropriate gasometers. Other smaller orifices 27, inserted in the top of each gas collecting compartment, are normally closed by rubber stoppers. In the event that it becomes necessary to flush out the gas mains and cells with an inert gas such as nitrogen, these stoppers are removed to allow the nitrogen to escape through the gas collecting compartments into the atmosphere.

Another orifice 29 is located in the above mentioned flange of the cell top in a position such that access is provided to the electrolyte within the space enclosed by the asbestos skirting and the tank walls. This orifice may be used for taking the temperature of the electrolyte in the tank or, if desired, it may be used for the purpose of adding fresh electrolyte to the cell.

In addition to the above mentioned spacers or saddles 28, which serve to separate the upper edge of each electrode from the bottom of the concrete cover, spacers or insulator strips 28ª are also provided on the vertical edges of the enclosed electrodes. These strips are fastened to the electrodes by means of clip fasteners and are of sufficient width that when the diaphragm material is wrapped tightly around them, they aid in shaping the diaphragm bags, and serve to prevent these bags from touching the electrodes. also on the bottom of the vertical edges of each electrode we provide spacers 28ᵇ which serve to prevent the electrodes from swinging.

In our preferred modification, the number of cathodes exceeds the numbers of anodes by one and, therefore, to effect a saving of material, we prefer to enclose only the anodes with diaphragm bags. If it were desired to employ an excess of anodes in the cell, it would be more economical to enclose only the cathodes within diaphragm bags.

We have found concrete to be a suitable material for use in the construction of our cell cover. While a number of different mixtures of cement and aggregate may be used, we prefer to use a mixture composed of one part of Portland cement to one part of crushed quartz, which gives a dense, hard and strong concrete. In constructing our cell covers, we use a reinforcing framework made up of steel rods of ¼ inch diameter, which are spot-welded together and completely covered by the concrete.

We have found in the operation of our type of electrolytic cell that the gases resulting from the decomposition of solutions by electrolysis are recoverable in a high state of purity and we have substantially eliminated the danger of the two gases mixing in any part of the apparatus. The original cost of the cell is considerably less than that of other types of cells and the maintenance cost is negligible. In addition, the elimination of the insulators heretofore necessary and the prevention of carbonation of the electrolyte by the gases of the atmosphere offer definite improvements over other types of electrolytic cells. The use of non-conducting material in the construction of our cell cover has substantially eliminated the possibility of the occurrence of short-circuits which, with the consequent corrosion of construction material in the usual type of cell and the promotion of secondary electrolysis therein, have been the source of serious operating difficulties where ordinary cells of the tank type have heretofore been used.

It will be apparent, of course, that the usefulness of our cell, which we have described and illustrated, is not limited to the electrolytic decomposition of water. Other electrolytic reactions may be conducted in our cell for the purpose of producing and recovering one or more gases separately and in a high state of purity.

Having thus fully described our invention, what we claim as new and desire to secure by Letters Patent is:

1. In a tank type electrolytic diaphragm cell, a unitary combined gas collector and cell cover cast of non-conductive material and comprising side walls, end walls, a top and a bottom forming a chamber therebetween, a gas-tight partition extending from the bottom to the top of said chamber thereby dividing said chamber into two gas collecting compartments, means for suspending alternative positive and negative electrodes from said cover, ports and inverted channels in the bottom of the cell cover, an aligned port and inverted channel over each electrode, each port and channel meeting and terminating at said partition, the ports above the positive electrodes extending into one of said gas collecting compartments and the ports above the negative electrodes extending into the other of said gas collecting compartments.

2. In a tank type electrolytic diaphragm cell, a unitary combined gas collector and cell cover cast of non-conductive material and comprising side walls, end walls, a bottom and a top forming a chamber therebetween, and said top extending beyond said side and end walls and said bottom and forming a flange, a gas-tight partition extending from the bottom to the top of said chamber thereby dividing said chamber into two gas collecting compartments, means for suspending alternate positive and negative electrodes from said cover, ports and inverted channels in the bottom of the cell cover, an aligned port and inverted channel over each electrode, each port and channel meeting and terminating at said partition, the ports above the positive electrodes extending into one of said gas collecting compartments and the ports above the negative electrodes extending into the other of said gas collecting compartments.

3. In a tank type electrolytic diaphragm cell, a unitary combined gas collector and cell cover cast of non-conductive material and comprising side walls, end walls, a top and a bottom forming a chamber therebetween, a gas-tight partition extending from the bottom to the top of said chamber thereby dividing said chamber into two gas collecting compartments, means for suspending alternate positive and negative electrodes from said cover, ports and inverted channels in the bottom of the cell cover, an aligned port and inverted channel over each electrode, each port and channel meeting and terminating at said partition, and said channels sloping uniformly upwardly towards said partition, the ports above the positive electrodes extending into one of said gas collecting compartments and the ports above the negative electrodes extending into the other of said gas collecting compartments.

4. In a tank type electrolytic diaphragm cell, a unitary combined gas collector and cell cover cast of non-conductive material and comprising side walls, end walls, a top and a bottom forming a chamber therebetween, a gas-tight partition extending from the bottom to the top of said chamber thereby dividing said chamber into two gas collecting compartments, means for suspending alternate positive and negative electrodes from said cover including rods extending vertically through said partition and joined at their lower ends to said electrodes, ports and inverted channels in the bottom of the cell cover, an aligned port and inverted channel over each electrode, each port and channel meeting and terminating at said partition, the ports above the positive electrodes extending into one of said gas collecting compartments and the ports above the negative electrodes extending into the other of said gas collecting compartments.

5. In an electrolytic diaphragm cell for the production of hydrogen and oxygen, a liquid-tight, tank-like receptacle, a unitary combined gas collector and cell cover for said receptacle, cast of non-conductive material and comprising side walls, end walls, a top and a bottom forming a chamber therebetween, a gas-tight partition extending from the bottom to the top of said chamber thereby dividing said chamber into two gas collecting compartments, means for suspending alternate positive and negative electrodes from said cover, electrical connections for said electrodes, ports and inverted channels in the bottom of the cell cover, an aligned port and inverted channel over each electrode, each port and channel meeting and terminating at said partition, the ports above the positive electrodes extending into one of said gas collecting compartments and the ports above the negative electrodes extending into the other of said gas collecting compartments.

6. In an electrolytic diaphragm cell for the production of hydrogen and oxygen, a liquid-tight, tank-like receptacle, a unitary combined gas collector and cell cover for said receptacle, cast of non-conductive material and comprising side walls, end walls, a top and a bottom forming a chamber therebetween, a gas-tight partition extending from the bottom to the top of said chamber, thereby dividing said chamber into two gas collecting compartments, means for suspending alternate positive and negative electrodes from said cover, diaphragm means surrounding said electrodes and secured to the bottom of said cover in substantially gas-sealing engagement therewith, ports and inverted channels in the bottom of the cell cover, an aligned port and inverted channel over each electrode, each port and channel meeting and terminating at said partition, the ports above the positive electrodes extending into one of said gas collecting compartments and the ports above the negative electrodes extending into the other of said gas collecting compartments.

EDWARD ARTHUR GEOFFREY COLLS.
ALEXANDER WHITESIDE MOORE.
DARCY DRUMMOND MORRIS.

CERTIFICATE OF CORRECTION.

Patent No. 2,293,594.   August 18, 1942.

EDWARD ARTHUR GEOFFREY COLLS, ET AL.

It is hereby certified that error appears in the printed specification of the above numbered patent requiring correction as follows: Page 1, first column, line 17, for "Alternative" read --Alternate--; page 2, second column, line 30, for "taype" read --type--; page 4, second column, line 5, for "also" read --Also--; line 9, for "numbers" read --number--; line 67, claim 1, for "alternative" read --alternate--; and that the said Letters Patent should be read with this correction therein that the same may conform to the record of the case in the Patent Office.

Signed and sealed this 1st day of December, A. D. 1942.

(Seal)

Henry Van Arsdale,
Acting Commissioner of Patents.